No. 838,452. PATENTED DEC. 11, 1906.
W. F. RESCHKE.
LISTER CULTIVATOR.
APPLICATION FILED JULY 26, 1906.
2 SHEETS—SHEET 2.
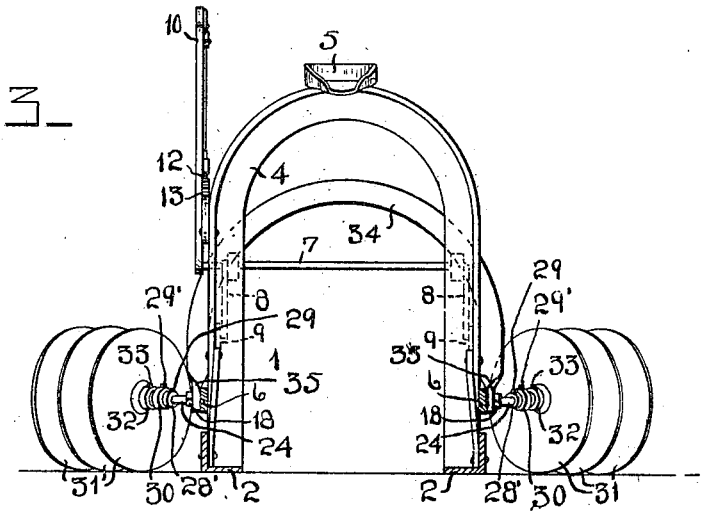
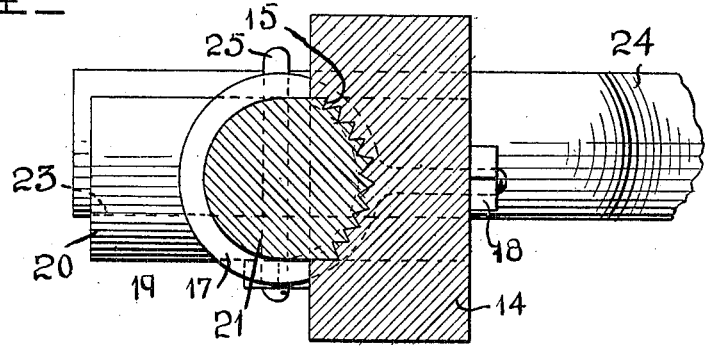
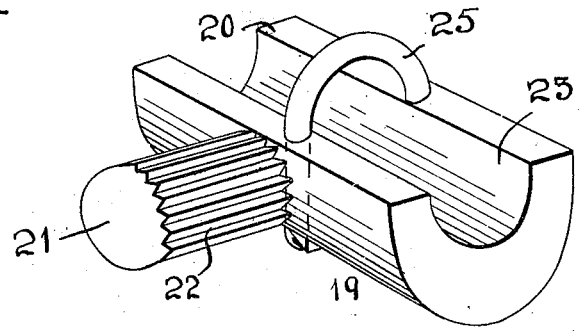
Witnesses
L. B. James
C. H. Griesbauer
Inventor
Wm. F. Reschke
by H. B. Willson & Co
Attorneys

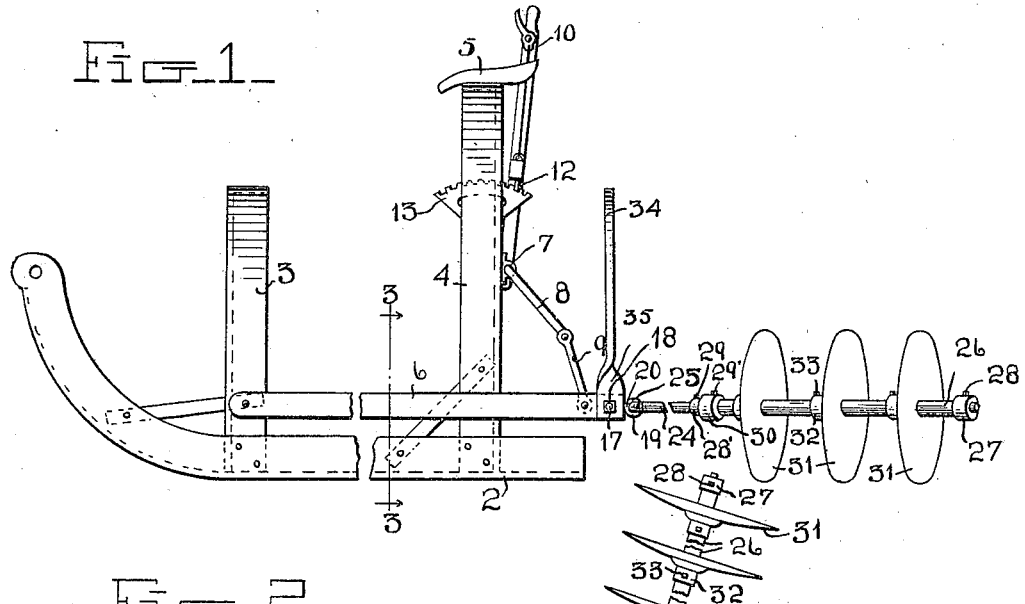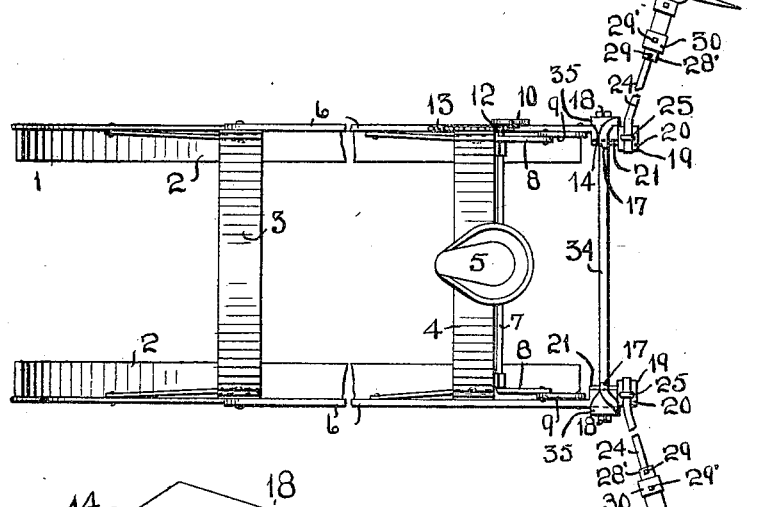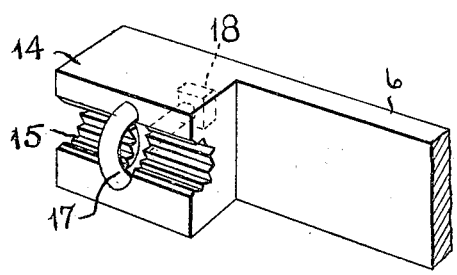

UNITED STATES PATENT OFFICE.

WILLIAM F. RESCHKE, OF PRATT, KANSAS.

LISTER-CULTIVATOR.

No. 838,452.　　Specification of Letters Patent.　　Patented Dec. 11, 1906.

Application filed July 26, 1906. Serial No. 327,841.

*To all whom it may concern:*

Be it known that I, WILLIAM F. RESCHKE, a citizen of the United States, residing at Pratt, in the county of Pratt and State of Kansas, have invented certain new and useful Improvements in Lister-Cultivators; and I do declare the following to be a full, clear, and exact description of the invention, such as will enable others skilled in the art to which it appertains to make and use the same.

This invention relates to improvements in lister-cultivators.

The object of the invention is to provide a cultivator of this character adapted to be supported upon runners and having means whereby the cultivator-disks may be readily adjusted to various working positions.

With the above and other objects in view the invention consists of certain novel features of construction, combination, and arrangement of parts, as will be hereinafter described and claimed.

In the accompanying drawings, Figure 1 is a side view of a cultivator constructed in accordance with the invention. Fig. 2 is a plan view of the same. Fig. 3 is a vertical cross-sectional view on the line 3 3 of Fig. 2. Fig. 4 is an enlarged horizontal sectional view through the outer end of one of the beams, the disk-shaft, and the bearing-sleeve arranged thereon. Fig. 5 is a detail perspective view of the outer end of one of the beams, and Fig. 6 is a similar view of one of the disk-axle clamps.

Referring more particularly to the drawings, 1 denotes a sled, which is preferably constructed of angle-iron runners 2, the forward ends of which are turned upwardly and have connected thereto a suitable draft appliance. The runners are connected together near their forward ends by an arched angle-iron bar 3 and near their rear ends by an arched angle-iron bar 4, on which is secured the driver's seat 5.

Pivotally connected at their forward ends to the lower ends of the arched bar 3 are parallel rearwardly-projecting beams 6, which are preferably formed of flat steel bars. Journaled in bearings on the side piece of the rear arch 4 is a horizontal transversely-disposed adjusting-shaft 7, the outer ends of which are bent rearwardly at right angles to form crank-arms 8. The outer ends of the arms 8 are pivotally connected to the rear ends of the levers 6 by means of links 9.

Connected to one end of the shaft 7 is an upwardly-projecting adjusting-lever 10, which is preferably provided with a pawl 12, adapted to engage the teeth of a segmental rack 13, secured to the rear arch, as shown.

The rear ends of the beams 6 are provided with offset projections or bearing-blocks 14, in which are formed longitudinally-disposed grooves or channels 15, the walls of which are provided with a series of longitudinally-disposed corrugations 16. Arranged in the blocks 14 are transversely-disposed bolt-holes through which are adapted to project eyebolts 17, the outer threaded ends of which are provided with nuts 18, by means of which the position of the eyebolts may be regulated.

Adapted to be adjustably connected with the block 14 are axle-clamps 19, said clamps preferably consisting of a head 20, having an integrally-formed right-angularly-projecting shank 21, which is provided with longitudinal corrugations 22. The shank 21 is adapted to be engaged with the grooves 15 in the blocks 14, the corrugations on said shank fitting into the corrugations in the channel-walls, by means of which the angle of the heads 20 may be adjusted. Said heads 20 are held in their adjusted positions by the engagement of the eyebolt 17 with the shank 21, as will be understood. In the head 20 is formed a transversely-disposed groove or channel 23, with which is adapted to be engaged the inner curved ends of disk supporting-axles 24. The ends of the axle 24 are securely held in the grooves or channels 23 by means of U-shaped clamping-bolts 25, arranged in the heads 20, as clearly shown in Fig. 6 of the drawings.

The axles 24 when mounted as hereinbefore described will project obliquely from the beams 6 and sides of the sled. On each of the axles 24 is revolubly mounted a bearing-sleeve 26, said sleeve being held in position at its outer end by means of a dust-proof cap or collar 27, which is adjustably secured on the axle by means of a set-screw 28. The opposite or inner ends of the sleeves 26 are held in position by means of a stop-collar 28', which is secured to the axle by a set-screw 29. On said inner end of the sleeve is secured, by means of a set-screw 29', a dust or sand band 30, which projects over the meeting edges of the sleeve 26 and the stop-collar 28, as shown.

Arranged on the sleeve 26 is a series of disk cultivators 31, the hubs 32 of which are adjustably secured on the sleeve 26 by means of set-screws 33, whereby the position of said disks on the sleeves may be varied.

The rear ends of the beams 6 are preferably connected together and braced by means of an arched bar 34, said bar being bent or curved edgewise with its opposite ends twisted to engage the outer sides of the beams, as shown at 35, said twisted ends being provided with bolt-holes to receive the ends of the eyebolts 17, by means of which and the nuts 18 thereon the bar 34 is securely attached to the beams.

A cultivator constructed as herein shown and described will be found to be strong and durable in construction and light in weight, and by connecting the axle-clamps with the beams, as herein shown, said axle and the disks may be adjusted to the desired position, and by means of the lever 10 the cultivator-disk may be raised or lowered to work the ground more or less deeply and when not in use may be raised entirely off the ground.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of the invention as defined by the appended claims.

Having thus described my invention, what I claim as new, and desire to secure by Letters Patent, is—

1. In a cultivator, comprising a supporting-sled, beams pivotally connected thereto, axle-clamps adjustably secured to the outer ends of said beams, cultivator-axles supported in said clamps, bearing-sleeves revolubly mounted on said axle, cultivator-disks adjustably mounted on said sleeves, and means to raise and lower said beams and the parts carried thereby, substantially as described.

2. A cultivator of the character described comprising a supporting-sled having runners, arched bars connecting said runners, beams pivotally connected at their forward ends to one of said arched bars, bearing-blocks arranged on the outer ends of said beams, said blocks having longitudinally-disposed corrugated channels, clamping-bolts arranged in said blocks, axle-clamps having corrugated shanks adapted to be adjustably engaged and secured in said blocks, cultivator-axles secured in said clamps, and having cultivator-disks mounted thereon.

3. A cultivator of the character described comprising a sled, beams pivotally connected at their forward ends to said sled, an adjusting-shaft mounted on the rear end of said sled, crank-arms on said shaft, links pivotally connecting the crank-arms to the outer ends of said beams, an operating-lever arranged on said shaft whereby the latter is turned to raise and lower said beams, bearing-blocks arranged on the outer ends of the beams, said blocks having formed therein longitudinally-corrugated grooves, an eyebolt arranged in said blocks to coact with said grooves, axle-clamps having longitudinal corrugated shanks adapted to be engaged with the groove in said blocks and to be secured in its adjusted position by means of said eyebolt, cultivator-axles arranged in said clamps and having cultivator-disks, a U-shaped clamping-bolt adapted to hold said axles in place.

In testimony whereof I have hereunto set my hand in presence of two subscribing witnesses.

WILLIAM F. RESCHKE.

Witnesses:
W. F. BARNS,
L. C. MILLER.